May 6, 1958
J. W. ANDREWS ET AL  2,833,006
METHOD OF INCREASING THE GROUNDLINE PROTECTION OF WOOD POLES TREATED WITH OIL-TYPE PRESERVATIVES
Filed Aug. 11, 1955
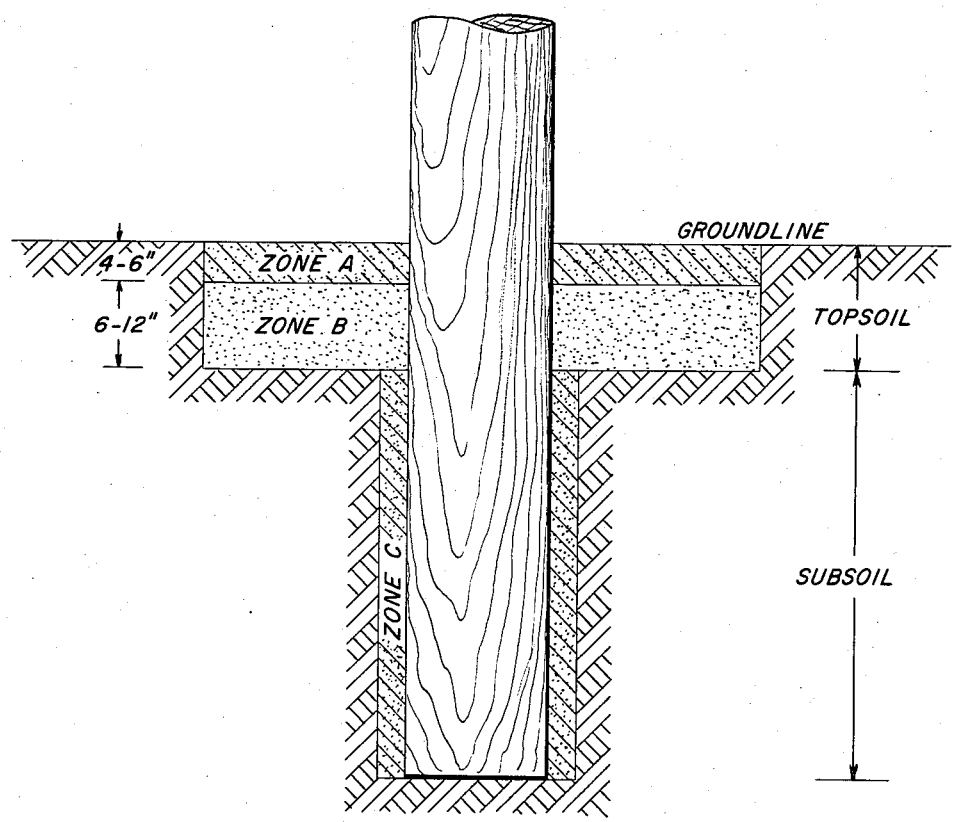
INVENTORS:
JOHN W. ANDREWS and
CHARLES W. LEACH,
BY: Donald G. Dalton
their Attorney.

2,833,006
Patented May 6, 1958

2,833,006

METHOD OF INCREASING THE GROUNDLINE PROTECTION OF WOOD POLES TREATED WITH OIL-TYPE PRESERVATIVES

John W. Andrews, Pittsburgh, and Charles W. Leach, Trafford, Pa., assignors to United States Steel Corporation, a corporation of New Jersey Application August 11, 1955, Serial No. 527,674

7 Claims. (Cl. 20—100)

This invention relates to a method of increasing the groundline protection of wood poles treated with oil-type preservatives, such as creosote and pentachlorophenol-petroleum mixtures.

Service records indicate that wood poles properly treated with creosote have an average life of about thirty years when placed in the ground under exposure to fungi and termite attack. The greatest attack occurs at or near the groundline, where the soil is a natural habitat for many kinds of soil microflora, including wood-destroying fungi. The loss in mechanical strength caused by fungi attack soon destroys serviceability of a pole. We have discovered that acid soils whose pH value is 6 or lower inhibit the growth of such wood-destroying fungi as *Lentinus lepideus* and *Lenzites trabea*. An oil-type preservative in a pole tends to diffuse both downwardly from upper portions and upwardly from the butt and reaches a maximum concentration near the groundline. This trend is beneficial and improves the life of a pole, since the preservative attains maximum concentration where it is most needed. Nevertheless it is desirable that the high concentration zone extend downwardly from the groundline to a depth of about two feet. We have discovered that contact with an acid soil also promotes retention of preservative in the outer portions of the pole below the groundline.

An object of our invention is to provide an improved method of increasing the protective life of oil-type wood preservatives, such as creosote or pentachlorophenol-petroleum mixtures, by acidifying the soil in contact with the pole in the proximity of the groundline.

A further object is to provide an improved method of increasing the protective life of oil-type preservatives by surrounding the portion of a pole immediately below the groundline with particles of a hydrogen ion exchange medium insoluble in water.

A further object is to provide an improved pole installation in which the pole is surrounded with particles of a hydrogen ion exchange medium insoluble in water immediately below the groundline.

In the drawing the single figure shows a vertical section of the lower portion of a pole installed in accordance with our invention. The pole is of wood impregnated with an oil-type preservative in any conventional way and is placed vertically in the ground to a depth of about five or six feet. The upper 10 to 18 inches of soil immediately below groundline may be considered topsoil, and the soil therebelow subsoil. The topsoil is excavated to a radius about two feet greater than the pole radius, while the subsoil is excavated only to a sufficient radius to allow the butt end of the pole to be inserted. The excavation is considered as having three zones A, B and C. Zone A, which includes the upper four to six inches of excavation, is filled with any suitable neutral or acid material, commonly the local topsoil, as long as it is not highly alkaline. Zone B, which includes the remainder of the excavation through the topsoil, is acidified in accordance with our invention. Zone C, which includes the portion of the excavation within the subsoil, is filled with any suitable material preferably similar to the surrounding subsoil.

To furnish the desired acidity, zone B contains a powdered hydrogen ion exchange material. This material is a polyelectrolyte in which numerous acid substituents are held together by straight or cross-linked carbon chains. The most common types include:

Straight-linked chains:

Hydrolyzed polyacrylonitrile
Polymethacrylic acid
Copolymers of maleic acid and polyvinylacetate
Pectic acid
Alginic acid
Other polyuronides Cross-linked chains:

Sulfonated copolymers of styrene and divinylbenzene
Phenol-formaldehyde resins
Sulfonated polystyrene
Sulfonated polyphenolics
Sulfonated coal The ion exchange material must have a sufficiently high molecular weight that it is insoluble in water, and preferably has a particle diameter of about 0.4 to 0.6 mm., and an apparent density of about 1 to 2 grams per cubic centimeter. Suitable materials often are sold commercially in the form of their alkali metal salts, which can be converted to the desired form by washing with a dilute mineral acid such as $H_2SO_4$ or HCl.

As placed in the ground, the ion exchange material consists of molecules which carry numerous hydrogen ions in exchange positions. When this material becomes moisture laden in service, it takes on cations, such as calcium, magnesium and sodium, from the water and releases hydrogen ions. In this manner the pH value of the water in the ion exchange material attains a range of about 3 to 5. Zone B preferably is filled exclusively with the ion exchange material, although it can be diluted up to about fifty percent with inert material such as sand or gravel and still furnish sufficient ion exchange capacity to be beneficial. The acidity of the soil inhibits growth of wood destroying organisms and also promotes retention of preservative in the adjacent regions of the pole.

As a specific example of our invention, we installed a creosote treated wood pole in the manner shown in the drawing using sulfonated polystyrene as the ion exchange material in zone B. The material we used had a sufficiently high molecular weight and cross linkage within its molecules that it showed a solubility in the water as low as 0.02 to 0.03%. Sulfonation of the intermediate product polystyrene was sufficient to produce an exchange capacity (maximum weight of cations that can be removed from water solutions) of 1 to 10 milliequivalents per gram of material. For this exchange capacity range a sulfur content of 3 to 20% was needed. The material was undiluted with inert material as placed in the ground. After becoming moisture laden, the material showed a pH value of about 3.

While we have described certain specific modes of practicing our invention, it is apparent that modifications may arise. Therefore, we do not wish to be limited to the disclosure set forth but only by the scope of the appended claims.

We claim:

1. A method of increasing the groundline protection of wood poles treated with oil-type preservatives comprising surrounding the pole with a powdered water insoluble hydrogen ion exchange material in contact therewith in the proximity of the groundline.

2. A method of increasing the groundline protection of wood poles treated with oil-type preservatives comprising surrounding the pole with a zone which consists of at least 50 percent of a powdered water insoluble hydrogen ion exchange material and the remainder inert material in contact with the pole in the vicinity of the groundline, said ion exchange material having a particle diameter of about 0.4 to 0.6 mm. and an apparent density of about 1 to 2 grams per cubic centimeter.

3. A method of installing a wood pole treated with an oil-type preservative comprising inserting the pole in an excavation, filling a zone of the excavation in the vicinity of the groundline with a powdered water insoluble hydrogen ion exchange material, and covering said material with soil.

4. A method of installing a wood pole treated with an oil-type preservative comprising inserting the pole in an excavation which has an enlarged portion through the topsoil, filling a zone of said enlarged portion with at least 50 percent of a powdered water insoluble hydrogen ion exchange material and the remainder inert material, and covering said materials with soil.

5. A method of installing a wood pole treated with an oil-type preservative comprising inserting the pole in an excavation which has an enlarged portion through the topsoil, filling a zone of said enlarged portion with a powdered water insoluble hydrogen ion exchange material to establish a pH value of 3 to 5 in this region, and covering said material with nonalkaline soil.

6. An installation comprising a wood pole treated with oil-type preservative inserted in the ground, a zone of powdered water insoluble hydrogen ion exchange material in contact with the pole in the proximity of the groundline, and a covering of soil over said material.

7. A method of increasing groundline protection of wood poles treated with oil-type preservative, which method promotes retention of preservative within the wood in the critical region in proximity of the groundline, as well as inhibiting growth of fungi in this region, comprising surrounding the pole with a zone which consists of at least 50 percent of a powdered water-insoluble hydrogen ion exchange material and the remainder inert material in contact with the pole in the vicinity of the groundline, said ion exchange material having a particle diameter of about 0.4 to 0.6 mm. and an apparent density of about 1 to 2 grams per cubic centimeter, said ion exchange material acidifying soil moisture to produce a pH value therein of about 3 to 5 and maintaining such acidity for an extended period.

References Cited in the file of this patent

UNITED STATES PATENTS

| | | |
|---|---|---|
| 1,559,507 | Leedom | Oct. 27, 1925 |
| 2,374,999 | Holbrook | May 1, 1945 |

FOREIGN PATENTS

| | | |
|---|---|---|
| 503,873 | Canada | June 22, 1954 |

OTHER REFERENCES

McCulloch: Disinfection and Sterilization (1936), pages 256–271.

Rabate: Chem. Abstracts, vol. 46 (1952), page 5333.